United States Patent [19]

Nebelung et al.

[11] Patent Number: 4,678,494
[45] Date of Patent: Jul. 7, 1987

[54] BLOWHEAD ARRANGEMENT FOR A GLASSWARE CONTAINER MANUFACTURING MACHINE

[75] Inventors: Hermann H. Nebelung, Zurich, Switzerland; Werner-Dieter Knoth, Essen, Fed. Rep. of Germany

[73] Assignee: Emhart Industries, Inc., Farmington, Conn.

[21] Appl. No.: 553,941

[22] Filed: Nov. 12, 1983

[30] Foreign Application Priority Data

Nov. 30, 1982 [GB] United Kingdom ............... 8234097

[51] Int. Cl.$^4$ .............................................. C03B 9/14
[52] U.S. Cl. ......................................... 65/261; 65/300
[58] Field of Search ................. 65/233, 261, 262, 263, 65/300

[56] References Cited

U.S. PATENT DOCUMENTS

| 2,123,145 | 7/1938 | Peiler | 65/262 |
| 2,198,750 | 4/1940 | Winder | 65/263 |
| 2,442,315 | 5/1948 | Samuelson et al. | 65/262 |
| 2,627,702 | 2/1953 | Lowe | 65/300 |
| 3,871,856 | 3/1975 | Trahan | 65/300 |

FOREIGN PATENT DOCUMENTS 183066 4/1967 Fed. Rep. of Germany ........ 65/300

Primary Examiner—S. Leon Bashore
Assistant Examiner—Michael K. Boyer
Attorney, Agent, or Firm—H. Samuel Kieser

[57] ABSTRACT

The blowhead arrangement comprises a blowhead (18) and a support (10,12,16) therefor. The support defines a passage (50,52,54,56,58,60) through which a first supply of air under pressure can be supplied to the blowhead (18) and a passage (70,74) through which a second supply of air under pressure can be supplied to the blowhead. The first of the supplies of air is used to blow a glass parison in a mould cavity to the shape of the cavity when the blowhead (18) is in position on the glass parison. The second supply is used to cool the finish of the parison by impinging on the finish from openings (90) in the blowhead.

4 Claims, 1 Drawing Figure

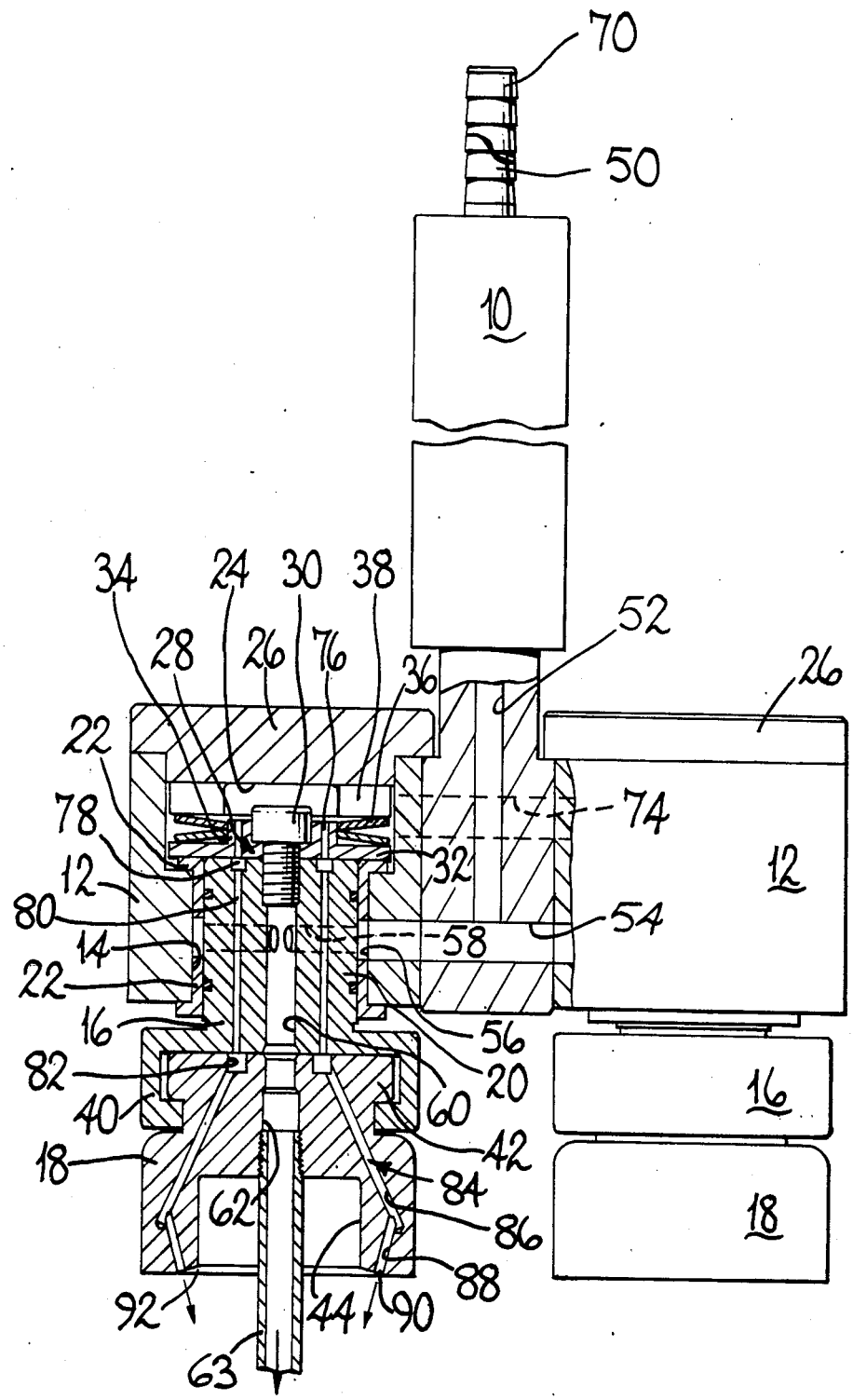

BLOWHEAD ARRANGEMENT FOR A GLASSWARE CONTAINER MANUFACTURING MACHINE

BACKGROUND OF THE INVENTION

This invention is concerned with a blowhead arrangement for a glassware container manufacturing machine comprising a blowhead and a support therefor, the support defining a passage through which a supply of air under pressure supplied to the support can be transmitted to a blowing passage in the blowhead so that, when the blowhead is positioned with its blowing passage in communication with the opening of a glass parison in a mould cavity, air from the blowing passage blows the parison to the shape of the mould cavity.

In the manufacture of glassware containers, parisons are formed either by a pressing or a blowing operation and are transferred to a mould for final blowing to the shape of a mould cavity. The parison is positioned in the mould and a blowhead is moved into position on the parison so that air under pressure can be blown from the blowhead into the parison to cause it to expand to the shape of the mould cavity. In some types of blowhead, a passage through the blowhead is aligned with the opening in the top of the parison and air is merely blown through the passage and into the opening of the parison so that a pressure above atmospheric pressure is achieved in the parison. With this type of blowhead, the air entering the parison causes very little cooling effect to the parison and this cooling does not affect the portion of the parison around the opening into the parison (which portion is hereinafter called the "finish" of the parison) by which the parison is supported in the mould. In other types of blowhead, a tube extends from the blowhead into the parison and air is blown through the tube into the parison and escapes from the parison by passing back into the blowhead through a passage which is coaxial with and surrounds the tube. The air passing back into the blowhead passes to a throttled exhaust which is set to achieve the desired blowing pressure in the parison. With this type of blowhead, there is a more marked cooling effect on the parison caused by the air entering it from the blowhead because there is a greater flow of air through the parison. However, this cooling hardly affects the finish of the parison. It is, however, desirable that the finish of the parison should be cooled to prevent it from distorting and causing the parison to collapse within the mould and also so that takeout means which removes the container from the mould can safely grip the finish.

It is an object of the present invention to provide a blowhead arrangement for a glassware container manufacturing machine by which the finish of a parison being blown by the blowhead is subjected to increased cooling.

BRIEF SUMMARY OF THE INVENTION

The invention provides a blowhead arrangement for a glassware container manufacturing machine comprising a blowhead and a support therefor, the support defining a passage through which a supply of air under pressure supplied to the support can be transmitted to a blowing passage in the blowhead so that, when the blowhead is positioned with its blowing passage in communication with the opening of a glass parison in a mould cavity, air from the blowing passage blows the parison to the shape of the mould cavity, wherein the support also defines a further passage through which a further supply of air under pressure supplied to the support can be transmitted to passages in the blowhead which, when the blowhead is positioned with its blowing passage in alignment with the opening of a glass parison in a mould cavity, have openings directed toward a finish of the parison so that air leaving the passages impinges on the finish.

With a blowhead arrangement in accordance with the last preceding paragraph, the blowhead can be brought to a position in which its blowing passage is in alignment with the opening of a glass parison in a mould cavity but the blowhead is spaced from the parison, air can then be blown through the passages of the blowhead so that the finish of the parison is cooled before the blowhead is moved towards the parison to bring the blowing passage into communication with the opening of the parison. Alternatively, the blowhead can be brought directly into a position in which its blowing passage communicates with the opening of the parison and air can then be blown through the passages of the blowhead so that the finish of the parison is cooled. In either case, increased cooling of the finish is achieved.

In order to increase the uniformity of the flow of cooling air through the blowhead arrangement, the further passage in the support may communicate with a plenum chamber within the support to which the passages in the blowhead are connected by further passages in the support. These further passages in the support may communicate with an annular chamber formed between the support and the blowhead with which the passages in the blowhead communicate; this ensures that the passages in the blowhead remain in communication with the further passages in the support should the blowhead turn relative to the support.

In order to achieve uniform cooling of the finish of the parison, the openings of the passages in the blowhead may be arranged in a circle centred on the blowing passage of the blowhead.

So that the openings of the passages in the blowhead are not closed by contact with the mould, the openings of the passages may be in an upwardly tapering recess in a bottom surface of the blowhead. In order to increase the uniformity of flow of air through the openings of the passages in the blowhead, each of the passages in the blowhead may have an end portion extending from its opening; which end portion extends normally of its opening.

If the blowhead arrangement also comprises a valve by operation of which the passage of the support through which air is transmitted to the blowing passage can be connected to an exhaust instead of its supply of air under pressure, the blowing passage can be used to exhaust cooling air blown from the passages of the blowhead. This arrangement increases the air flow and therefore the cooling effect.

BRIEF DESCRIPTION OF THE DRAWING

There now follows a detailed description, to be read with reference to the accompanying drawing, of a blowhead arrangement which is illustrative of the invention. It is to be understood that the illustrative blowhead arrangement has been selected for description by way of example and not of limitation of the invention.

The drawing is a side elevational view of the illustrative blowhead arrangement with parts broken away to show the interior construction.

DETAILED DESCRIPTION OF PREFERRED EMBODIMENT OF THE INVENTION

The illustrative blowhead arrangement is for a glassware container manufacturing machine of the so-called "individual section" type. Such machines are provided with blowhead moving means which move blowheads between an out-of-the-way position thereof in which they do not obstruct the supply of parisons to moulds nor the removal of containers from the moulds and an operative position thereof in which the blowheads are in position on parisons and can be used to blow the parisons to the shape of the mould cavities. The illustrative blowhead arrangement comprises a support for a blowhead which comprises a shaft 10 by which the illustrative blowhead arrangement is clamped to the blowhead moving means of an individual section glassware container manufacturing machine (not shown). The support of the illustrative blowhead arrangement also comprises a housing 12 which extends transversely of the shaft 10 and is supported thereby.

The housing 12 defines two cylindrical recesses 14 in each of which a holder 16 for a blowhead 18 is mounted. As the construction of the two holders 16 of the support of the illustrative blowhead arrangement is identical, only one of the holders 16 is described in detail hereinafter. The holder 16 described is the left hand holder 16 (viewing the drawing) and parts associated with the right hand holder 16 which is not described are given the same reference numbers hereinafter. The holder 16 comprises an upper cylindrical portion 20 which is received in the recess 14 of the housing 12 and is supported therein by liner bushes 22. Above the cylindrical portion 20 of the holder 16, an annular chamber 24 is formed in the housing 12 and is closed from above by a cap 26. Within the recess 24 a support member 28 is secured to the portion 20 by means of a screw 30. The support member 28 has a transversely extending flange 32 which rests on an upper one of the liner bushes 22 and serves to support the support member 28 and the holder 16. The support member 28 also has an upstanding cylindrical portion 34 around which a cup spring 36 extends. The cup spring 36 bears on downwardly projecting studs 38 of the cap 26 and serves to provide a small amount of vertical float for the holder 16. A lower portion 40 of the housing 16 provides a bayonet-type fitting with an upper portion 42 of the blowhead 18 so that the holder 16 serves to support the blowhead 18.

The blowhead 18 has a cylindrical recess 44 formed in the bottom thereof which, when the blowhead 18 is in its operative position, surrounds the finish of a parison (not shown). The illustrative blowhead arrangements support is supplied with a supply of air under pressure to be used for blowing parisons to the shape of mould cavities in which the parisons are contained. The supply is passed to the illustrative blowhead arrangement through a flexible pipe (not shown) which is connected to a nipple 50 which is secured to the top of the shaft 10 in a longitudinal passage 52 extending downwardly through the shaft 10. The longitudinal passage 52 communicates with a horizontal passage 54 formed in the housing 12 which extends to both the holders 16. The passage 54 communicates with an annular recess 56 formed between the liner bushes 22 and around the upper cylindrical portion 20 of the holder 16. Horizontal passages 58 in the holder 16 communicate between the recess 56 and a central longitudinal passage 60 which extends vertically downwards in the holder 16. The passage 60 communicates with a vertical passage 62 through the blowhead 18 which extends into the recess 44 in the blowhead 18. Thus, the support of the illustrative blowhead arrangement defines a passage 52, 54, 56, 58 and 60 through which the supply of air under pressure can be transmitted to the passage 62 in the blowhead 18. The passage 62 and a tube 63 mounted therein form a blowing passage in the blowhead 18 which, when the blowhead 18 is positioned with its blowing passage 62, 63 in communication with the opening of a glass parison in a mould cavity, the tube 63 entering the parison, air from the blowing passage 62, 63 blows the parison to the shape of the mould cavity.

A further nipple 70 is mounted on top of the shaft 10 in a vertical passage similar to the passage 52 passing longitudinally downwardly in the shaft 10 (this passage is not visible in the drawing as it is masked by the passage 52). The nipple 70 is connected by means of a flexible pipe (not shown) to a further supply of air under pressure which is supplied to the support of the illustrative mould arrangement.

Air under pressure passing into the nipple 70 passes through the aforementioned vertical passage into a horizontal passage 74 which communicates with the annular recesses 24. From the annular recess 24 the air passes through a ring of vertical passages 76 through the support member 28 into an annular recess 78 formed in the upper surface of the cylindrical portion 20 of the holder 16. From the annular recess 78 the air passes through a ring of longitudinal passages 80 through the holder 16 to an annular recess 82 formed in the upper surface of the blowhead 18. The purpose of the annular recesses 78 and 82 is to ensure communication of the passages 76 and 80 and of the passages 80 with passages 84 in the blowhead, respectively. Thus, the support of the illustrative blowhead arrangement defines a further passage through which the further supply of air under pressure can be transmitted to passages 84 in the blowhead 18. The passages 84 in the blowhead 18 each comprise an upper portion 86 and a lower portion 88 which communicate with one another. The upper portion 86 of each passage 84 extends downwardly in a direction which is inclined outwardly of the centre of the blowhead 18 whilst the lower portion 88 extends downwardly in a direction which is inclined inwardly of the blowhead 18.

The lower end of each portion 88 of each passage 84 forms an opening 90 in a frusto-conical upwardly tapering recess 92 formed in the bottom surface of the blowhead 18 around the recess 44. The openings 90 are arranged in a circle centred on the passage 62 in the blowhead 18 and are directed towards a finish of the parison, when the blowhead 18 is positioned with its blowing passage 62, 63 in alignment with the opening of a glass parison in a mould cavity, air leaving the passages 84 through the openings 90 impinges on the finish and has a cooling effect thereon. The blowhead 18 may be brought to a position in which its blowing passage 62, 63 is in alignment with the parison opening either with the blowhead 18 spaced from the parison or with the tube 63 extending into parison opening. In the first case cooling takes place and then the blowhead 18 is moved so that the tube 63 enters the parison opening. In the second case, cooling and blowing take place simultaneously. Cooling of the finish may continue after a parison has been blown to the shape of the mould cavity, even as the blowhead 18 is raised away from the parison. The chamber 24 serves as a plenum chamber within the support to which the passages 84 in the blowhead are connected by the passages 80. The presence of the plenum chamber 24 serves to increase the uniformity of the air flow through the passages 84 in particular distributing the air flow uniformly around the passages 84. The tapering recess 92 serves to ensure that the openings 90 of the passages 84 are not closed by the blowhead 18 contacting the mould containing the parison. Since each of the passages 84 has an end portion 88 which extends from its opening 90 and this end portion 88 is arranged to extend normally of the opening 90, the air leaving the opening 90 is directed inwardly of the longitudinal axis of the blowhead 18 so that it impinges on the finish of the parison from all directions.

The illustrative blowhead arrangement also comprises a valve (not shown) by operation of which the nipple 50 and therefore the passage 52 can be disconnected from their air supply and connected instead to an exhaust. This enables the blowing passage 62, 63 to be used to exhaust cooling air blown from the passages 84 giving increased air flow and cooling effect.

We claim:

1. A blowhead arrangement for a glassware container manufacturing machine comprising a blowhead support, a blowhead mounted on said support, a first passage means in said support for connection to a first supply of air under pressure, a blowing passage means in said blowhead communicating with said first passage means so that, when the blowhead is positioned in the blowing position with the blowing passage means in communication with the opening of a glass parison in a mould cavity, air from the blowing passage blows the parison into the shape of the mould cavity, second passage means in said support for connection to a second supply of air under pressure, a series of means defining cooling passages in said blowhead communicating with said second passage means, the bottom surface of said blowhead having an upward and inwardly tapering recess, said cooling passages means having openings in said recess and an end portion on said bottom surface extending from said openings outwardly perpendicular to the surface of the tapering recess whereby air leaving the cooling passages impinges on the finish of the glass container.

2. A blowhead arrangement according to claim 1, wherein the second passage means in the support includes a plenum chamber within the support, and a series of passageway means connecting the plenum chamber with said cooling passage means in the blowhead.

3. A blowhead arrangement according to claim 2, wherein the second passageway means in the support communicates with an annular chamber formed between the support and the blowhead with which said cooling passage in the blowhead communicate.

4. A blowhead arrangement according to any one of claims 1 to 3, wherein the means defining openings of the cooling passages in the blowhead are arranged in a circle centered on the axis of the blowing passages of the blowhead.

* * * * *